(12) United States Patent
Magner

(10) Patent No.: US 8,437,627 B1
(45) Date of Patent: May 7, 2013

(54) APPARATUS FOR EXTENDING THE HOLDING TIME FOR FOOD

(75) Inventor: Erik Magner, Fort Wayne, IN (US)

(73) Assignee: Meister Cook, LLC, Fort Wayne, IN (US)

( * ) Notice: Subject to any disclaimer, the term of this patent is extended or adjusted under 35 U.S.C. 154(b) by 862 days.

(21) Appl. No.: 12/557,241

(22) Filed: Sep. 10, 2009

Related U.S. Application Data

(60) Provisional application No. 61/191,654, filed on Sep. 11, 2008.

(51) Int. Cl.
*A47J 27/00* (2006.01)
(52) U.S. Cl.
USPC ............ 392/382; 392/347; 392/356; 392/368
(58) Field of Classification Search ........................ None
See application file for complete search history.

(56) References Cited

U.S. PATENT DOCUMENTS

| | | | | |
|---|---|---|---|---|
| 3,780,794 A | * | 12/1973 | Staub | 165/58 |
| 3,962,962 A | * | 6/1976 | Anderson | 99/474 |
| 4,038,968 A | * | 8/1977 | Rovell | 126/261 |
| 4,121,091 A | * | 10/1978 | Wareham | 219/400 |
| 4,233,495 A | * | 11/1980 | Scoville et al. | 219/386 |
| 4,437,396 A | * | 3/1984 | Plattner et al. | 99/475 |
| 4,455,478 A | * | 6/1984 | Guibert | 219/400 |
| 4,499,818 A | | 2/1985 | Strong | |
| 4,812,621 A | * | 3/1989 | Brotherton et al. | 392/382 |
| 5,061,448 A | * | 10/1991 | Mahe et al. | 422/566 |
| 5,276,309 A | * | 1/1994 | Hasse et al. | 219/400 |
| 5,282,264 A | * | 1/1994 | Reeves et al. | 392/382 |
| 5,729,908 A | * | 3/1998 | Braden | 34/104 |
| 5,930,454 A | * | 7/1999 | Cho | 392/360 |
| 6,114,659 A | * | 9/2000 | Finck et al. | 219/214 |
| 6,261,621 B1 | | 7/2001 | Stanger et al. | |
| 6,914,221 B1 | * | 7/2005 | Witt et al. | 219/433 |
| 6,959,145 B1 | * | 10/2005 | Narvaez | 392/382 |
| 8,096,062 B1 | * | 1/2012 | Bellen | 34/90 |
| 2005/0100717 A1 | * | 5/2005 | Riddle | 428/195.1 |
| 2005/0103212 A1 | * | 5/2005 | Cronin et al. | 99/467 |
| 2008/0016881 A1 | * | 1/2008 | Steffensen et al. | 62/3.3 |
| 2011/0278278 A1 | * | 11/2011 | Emerich et al. | 219/400 |
| 2012/0138593 A1 | * | 6/2012 | Franklin et al. | 219/400 |

* cited by examiner

*Primary Examiner* — Thor Campbell
(74) *Attorney, Agent, or Firm* — Reichel IP LLP; Kevin R. Erdman; Mark C. Reichel

(57) ABSTRACT

The inventive warmer apparatus comprises a holding unit, enclosed on four sides, but open at the top to allow restaurants and kitchen operators easy access to food held in it. Food in the apparatus is exposed to radiant heat generated by a heated bottom surface and to hot convection air. Part of the convection air is used to create an air curtain to improve heat loss characteristics and protect from the environment. The apparatus uses a combination of radiant heat, convection air and a warm air curtain to keep food products hot and crisp. The air curtain provides additional food protection. The warmer apparatus conditions food to attain a noncooking biologically safe temperature and to retain its freshly cooked texture and internal moisture for at least twenty minutes. This allows restaurants to serve such food items longer to its customers, allowing more efficient batch cooking and significantly reducing food waste.

17 Claims, 9 Drawing Sheets

APPARATUS FOR EXTENDING THE HOLDING TIME FOR FOOD

CROSS-REFERENCE TO RELATED APPLICATIONS

This application claims the benefit of U.S. Provisional Application No. 61/191,654, filed Sep. 11, 2008, the disclosure of which is explicitly incorporated by reference herein.

BACKGROUND ART

The heating trays allow restaurants to keep french fries, fried onions, hash browns and other fried or non-fried food products hot and crisp longer before being served to customers.

The typical frying process includes the quick heating of food in a deep fryer at around and above 350 degrees F. During this frying process all moisture is quickly removed from the surface of the fried product giving it a hot and crisp appearance.

However, food items, such as french fries, fried onion rings, hash browns and other fried products, deteriorate quickly once removed from their primary cooking source. The typical hold time for french fries and other fried food products is between 5 and 7 minutes. Thereafter, such food products become soft and develop a greasy appearance. In fact, internal food moisture quickly creeps towards the outside of the food and softens the surface leading to many customer complaints about greasy and old french fries. The use of radiant heat and/or convection air in keeping food items hot and crisp has been described in other appliances and patents, such as U.S. Pat. Nos. 4,499,818 and 6,114,659 and 6,261,621 and others.

The original idea of improving holding times of fried food was described in U.S. Pat. No. 4,499,818 from 1985. U.S. Pat. No. 6,261,621 describes a fried food holding unit that is comprised of an upper heater (overhead heat lamps) and a lower heater and forced hot air through and across the fried food and with recirculating hot air. Many tests have shown that overhead heating lamps in any application will cause fried food to become moist quickly. U.S. Pat. No. 6,114,659 describes a food product bin having a bottom portion with a surface for receiving food products to be warmed, said bottom portion having first and second opposed edges and third and fourth opposed edges, first and second end walls disposed at said first and second opposite edges of said bottom portion, the regions above said bottom portion and along said third and fourth opposite edges between said first and second walls being substantially open to ambient atmosphere.

SUMMARY OF THE INVENTION

Embodiments of the inventive warmer apparatus comprise a holding unit that is enclosed on four sides, but open to the top allowing restaurants and kitchen operators easy access to food held in it. The food in the warmer apparatus is exposed to radiant heat generated by a heated bottom surface and to hot convection air. Part of the convection air is used to create an air curtain to improve heat loss characteristics and protect food from the environment.

The warmer apparatus uses a combination of radiant heat, convection air and a warm air curtain to keep food products hot and crisp. The air curtain provides additional food protection. Tests have shown that the warmer apparatus can extend the serviceable food holding period to more than 20 minutes. This allows restaurants to serve such food items longer to its customers, allowing for more efficient batch cooking and significantly reducing food waste.

One aspect of the invention is the development of a holding system that thermally maintains food items with a combination of radiant heat, convection air and a warm air curtain.

BRIEF DESCRIPTION OF THE SEVERAL VIEWS OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 1:
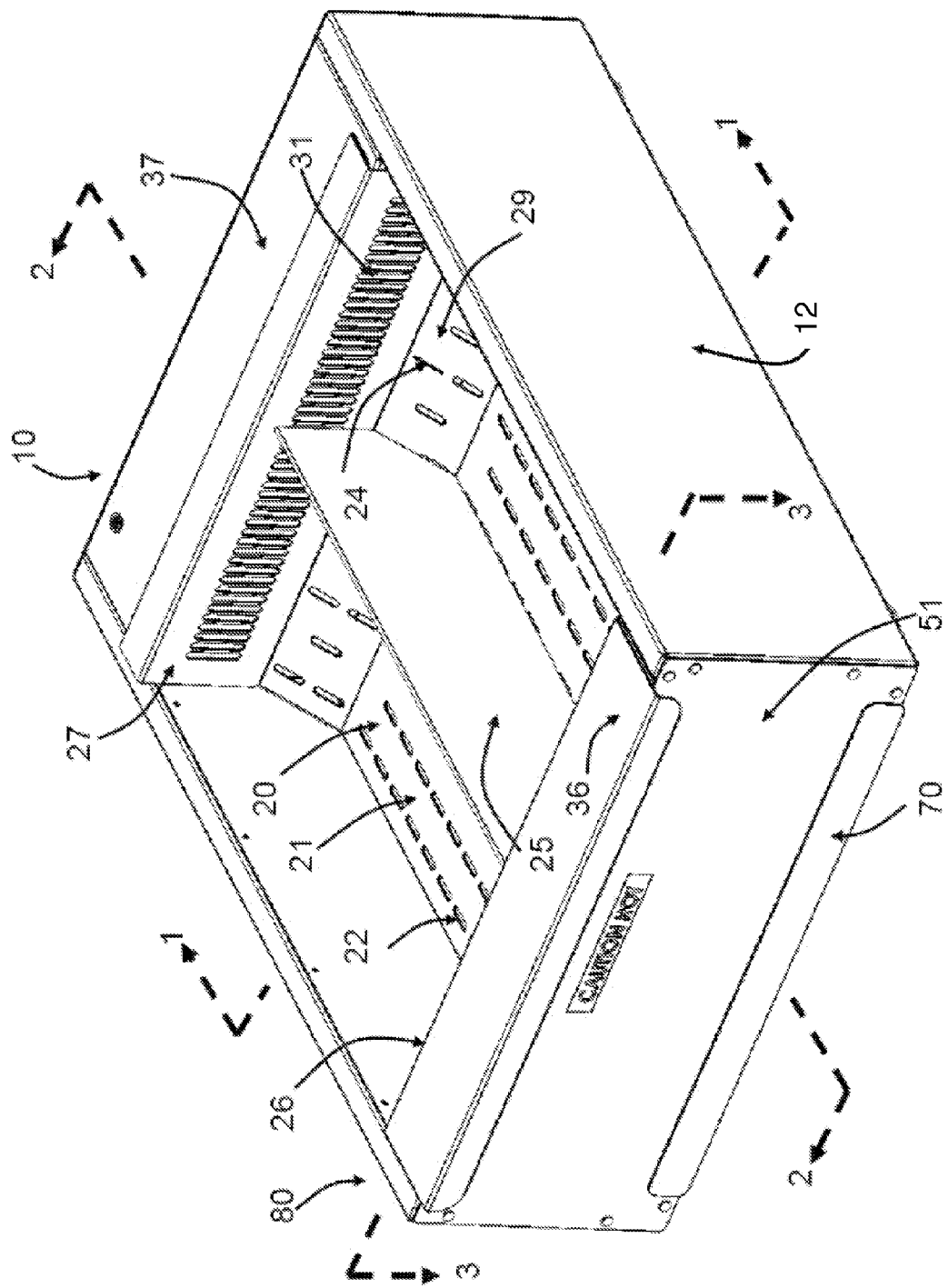
FIG. 1 is a perspective view of the warmer apparatus.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate embodiments of the invention, in several forms, and such exemplifications are not to be construed as limiting the scope of the invention in any manner.

DETAILED DESCRIPTION OF EMBODIMENTS OF THE INVENTION

The embodiments described and disclosed below are not intended to be exhaustive or limit the invention to the precise forms disclosed in the following detailed description. Rather, the embodiments are chosen and described so that others skilled in the art may utilize their teachings.

Various embodiments of an apparatus described here apply a balanced combination of radiant heat, warm air convection, and an insulating warm air curtain (a flow of unbounded coherent air) to quickly stop food from cooking and to hold the food at a biologically safe, satisfying temperature for at least twenty minutes. In so doing, the apparatus conditions the food to retain its freshly cooked texture and its internal moisture. Foods successfully conditioned by this apparatus include crisp fried food (such as french fries, chicken strips, onion rings, popcorn shrimp, and hash brown potatoes), bread (such as buns, biscuits, and rolls), egg rolls, croutons, and cookies. Radiant heat warms the food without overcooking it. Warm air convection warms the food without overcooking it while evaporating excess moisture from the food surface. A warm air curtain provides easy access to the food while preventing excess heat loss from the food holding area 13.

FIGS. 1 through 4 show warmer apparatus 10. The body of warmer apparatus 10 may be made of corrosion-resistant metal (such as stainless steel), ceramic, glass, or any other corrosion-resistant material that may withstand the operating temperatures and salt from the food. The apparatus body is made of stainless steel type 304 in one embodiment, of stainless steel type 316 in another embodiment, to resist corrosion. The body may be configured in any shape, with a rectangular shape being shown here.

Figure 9:
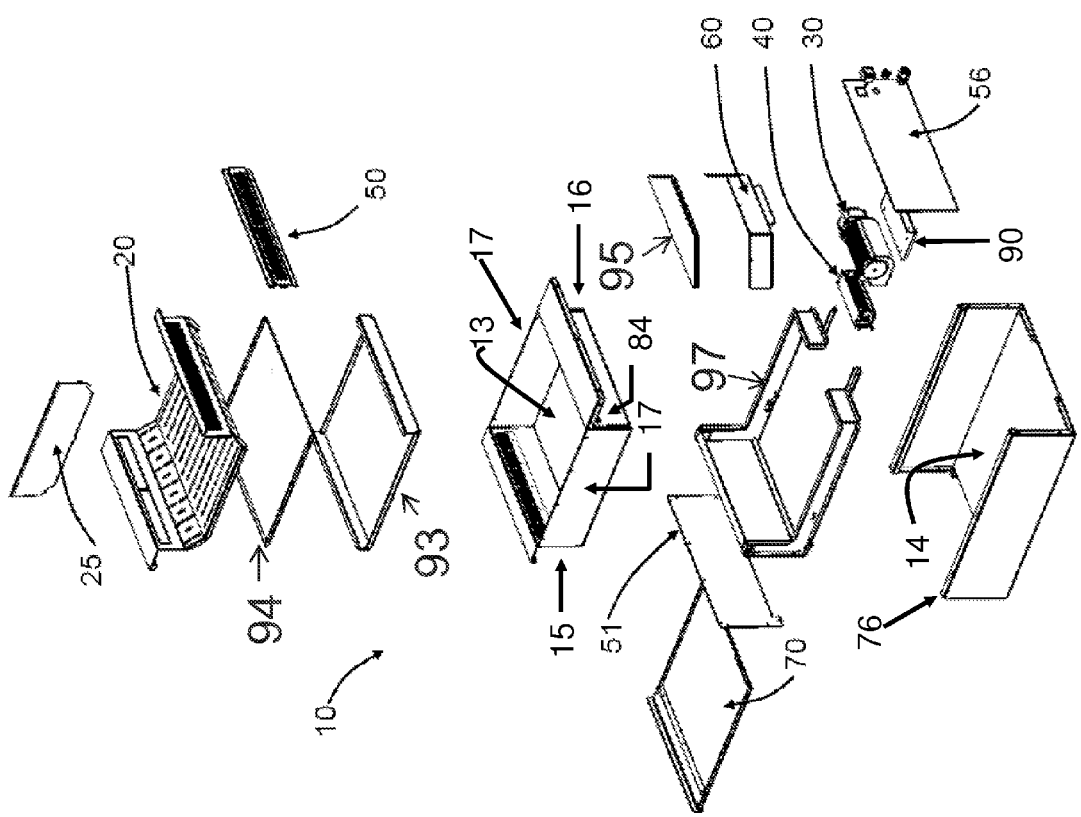
FIG. 9 is an exploded view of FIG. 1.

Removable food holder 20 nested within food holding area 13 which is defined at its bottom by supportive base portion 23 (comprised of frame 97 and tray 94 of FIG. 9) that is heated from below and in turn radiates heat to the food through apertures 22 in food holder surface 21 which contacts food placed within warmer apparatus 10 above food holder base 23. Food holder 20 may be configured in any shape, with rectangular being shown here, and may be used with objects and materials other than food if desired. Food holder 20 functions not only to support food and to admit radiant heat and warm convection air to the food, but also provides conditions that facilitate creation of the air curtain. Food holder 20 has at least one upright wall (shown here as a front section 26 and a back section 27) having an angled section (shown as a front section 28 and a back section 29). The shown angle is 45 degrees, but other angles work as well. Slots 24 in angled sections 28 and 29 hold removable dividers 25 for compartmentalizing different portions of food on food holder surface 21. Food holder walls 26 and 27 have apertures 31 and opposed air ports, shown here as air inlet port 33 of food holder back wall 27 and air outlet port 32 of food holder front wall 26, for allowing convection air to flow in and out of food holding area 13 to warm the food and to recirculate the warm flowing air.

In one embodiment air outlet port 32 and air inlet port 33 are separated by about 12 to 18 inches to allow formation of a robust air curtain. Horizontal front surface flange 36, shown as extending from the top of food holding area front wall 15, defines an upper boundary for air channel front vertical section 61, and horizontal back surface flange 37, shown as extending from the top of food holding area back wall 16 defines an upper boundary for air channel back vertical section 82 of air channel 81, 85, 61, 82. Horizontal food holder section flange 34, shown as extending from the top of the food holder 20, defines an upper boundary for the food holder. Additional vertical flange 35, extending down from horizontal flange 34, added to front section 26 of food holder 20 is an option that helps orient food holder 20 within food holding area 13, designed to keep a correctly positioned food holder level, and to tilt an incorrectly positioned food holder.

Walls 15, 16, and 54 and food holder base 23 define food holding area 13, with walls 15, 16, and 54 insulating food holding area 13, and food holder base 23 reflecting and transmitting heat received from horizontal air channel 41. The apparatus has a housing (including food holder base, sidewalls 55, a front wall 51, and a back wall 56, all of which may be supported by frame 97 of FIG. 9) that contains heat to minimize heating effects. In one embodiment, each side wall 55 may have air venting louvers (not shown) to discharge heat from within warmer apparatus 10.

Airflow assembly 80, through which a flow of warm air recirculates to the food and within the apparatus during operation, defines air channel 81, with back vertical section 82 having an air inlet 83 adjacent to the air inlet port 33 through which ambient air enters warmer apparatus 10, horizontal section 41 which underlies food holding area 13, and front vertical section 61, opposite back vertical section 82, having air outlet 84 adjacent to air outlet port 32 through which air leaves air channel 81. Air inlet 33 and air outlet 32 ports are aligned so that an air curtain may be formed between them, over the food. Air flow 85 is diagrammed in FIG. 3. Air velocity and air temperature increase in front vertical section 61 because front vertical section 61 has an area smaller than that of horizontal section 41.

Figure 5:
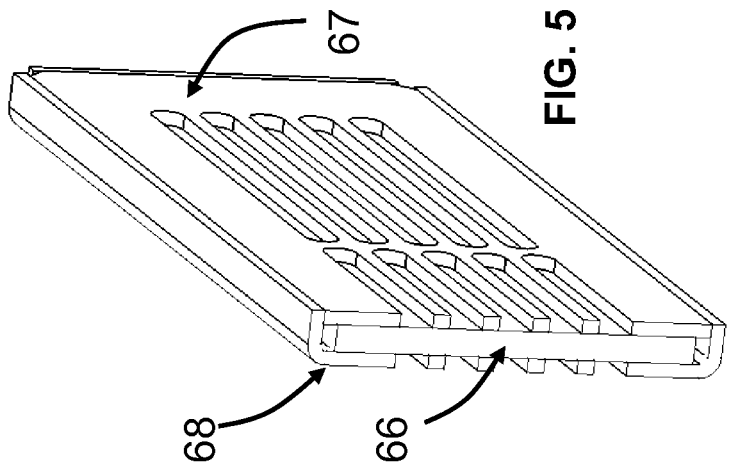
FIG. 5 is a perspective view, in partial cross-section, of the air filter.
Figure 6:
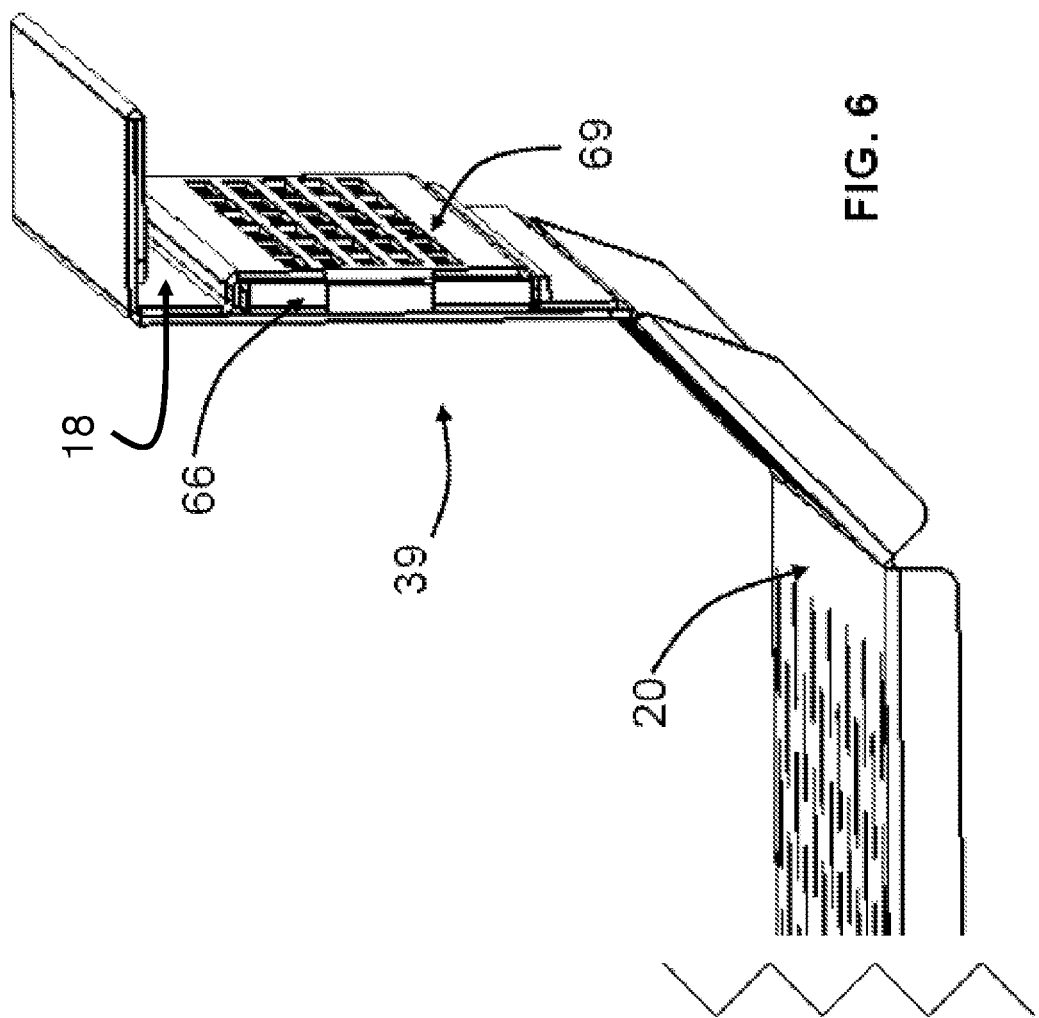
FIG. 6 is a perspective view of the food holder attached to the air filter.

Air filter bracket 49, 67, 68, 69 (FIG. 5) containing air filter 50 for removing impurities from air before air enters back vertical section 82, lies between food holder wall 27 and back vertical section 82. In one embodiment, the bracket is supported by the food holding area walls; in another embodiment (shown in FIG. 6) bracket 69 is attached to back surface 18 of food holder back wall 27. One embodiment of air filter 50 contains at least one layer of expanded, unflattened stainless steel metal having a maximum thickness of 0.025 inches, preferable less than 0.016 inches. Sharp edges of this thin metal create air turbulence; sudden change of the direction and velocity of air molecules inside the filter medium causes foreign particles and oil droplets to spin out of the air flow, separating air from air impurities.

Air flows from the air inlet port 33 through air filter to an air funnel 60 (which may be capped by extension 95 of FIG. 9), attached to the back wall of the housing. The air funnel has a base 48 having an open portion 87 over the blower 30, side walls 44, 45 that direct air to over the blower, a back wall, and a top (horizontal back surface 37). Extensions 88 of the funnel base, downwardly directed from the front and back edges of the open portion of the base, evident as flanges in one embodiment and as brackets attached to the base in another embodiment, prevent the blower under standard operating conditions (that is, conditions favorable to routine operation of the apparatus) from blowing air to any area except to the horizontal section 41 of the air channel 81. In another embodiment, attached to the interior of the air funnel is an optional ultraviolet light 91, which breaks down and burns air impurities such as oil droplets.

Figure 2:
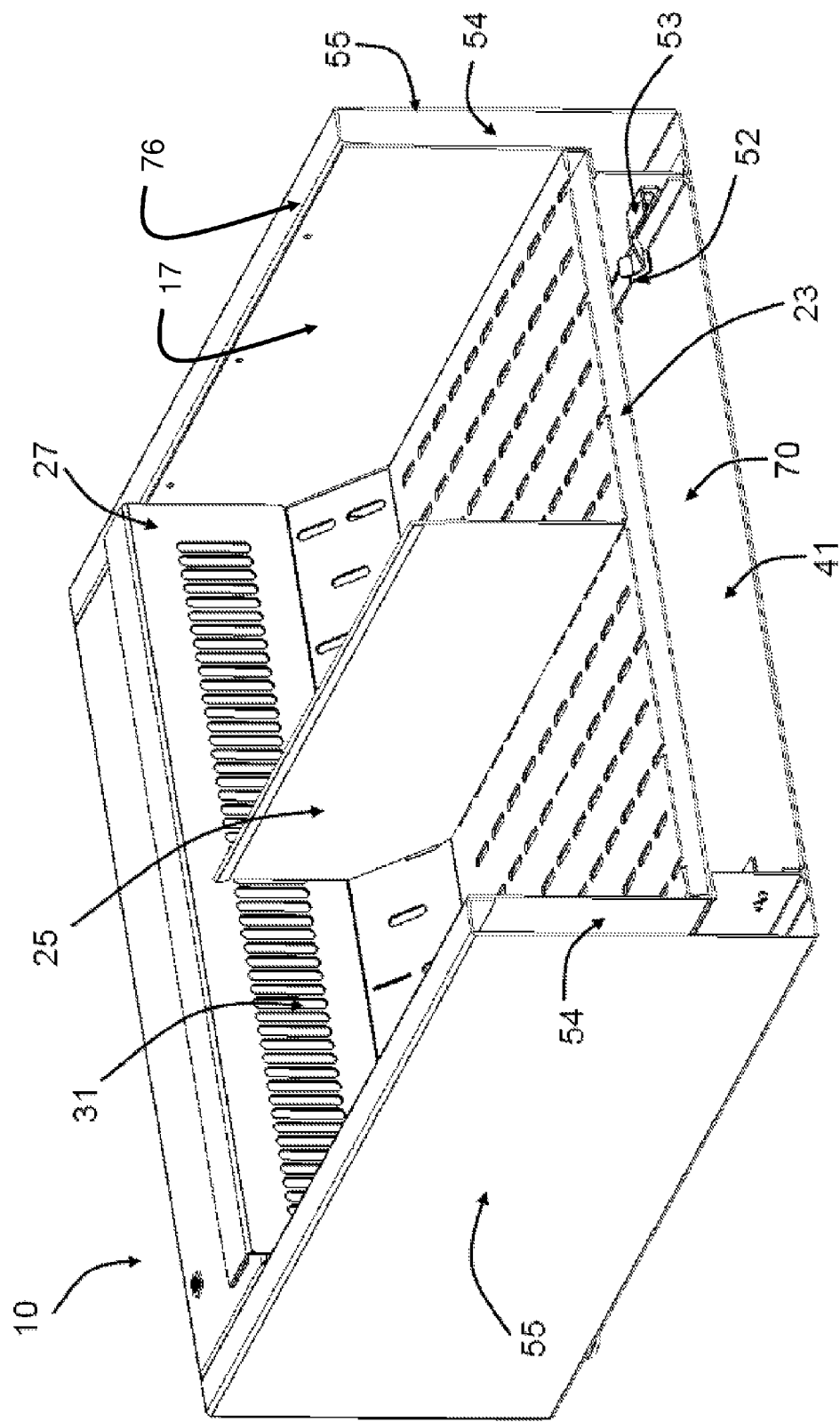
FIG. 2 is a perspective view, in partial cross-section, taken on section lines 1-1 of FIG. 1.
Figure 3:
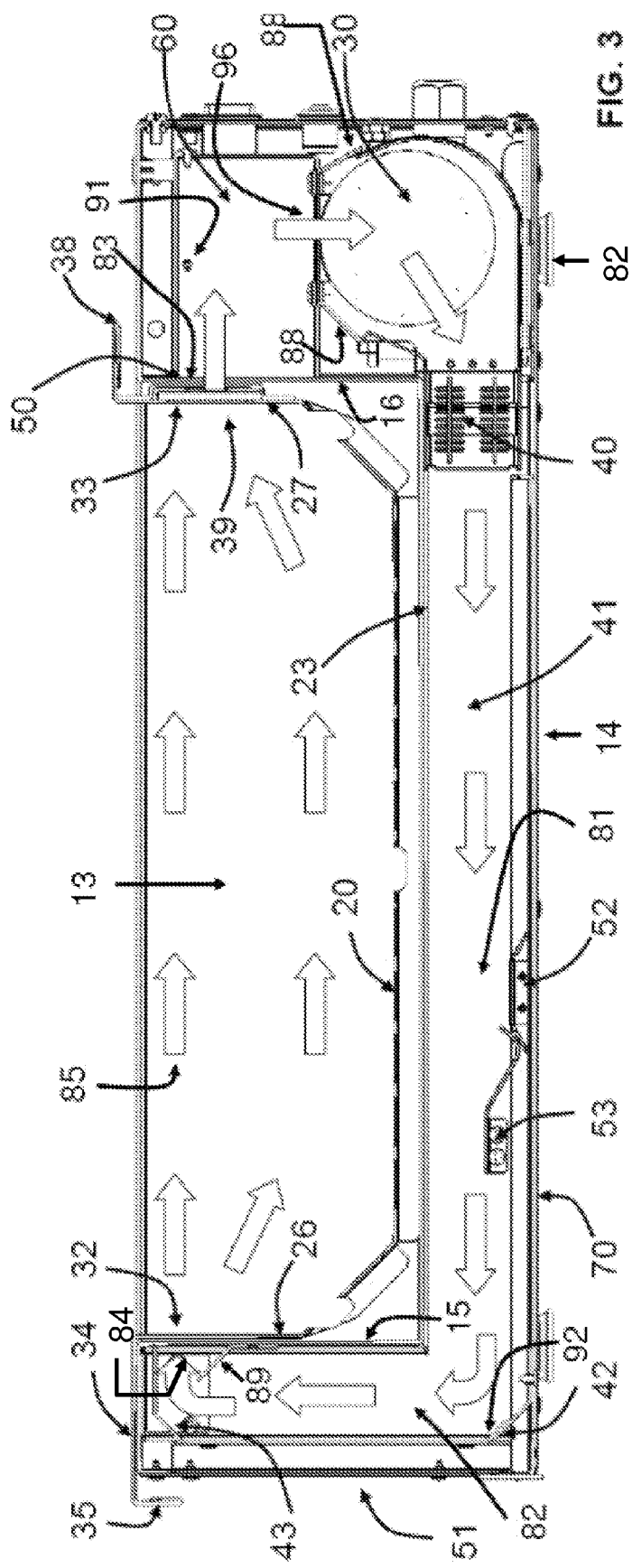
FIG. 3 is a side view, in cross-section, taken on section lines 2-2 of FIG. 1.
Figure 4:
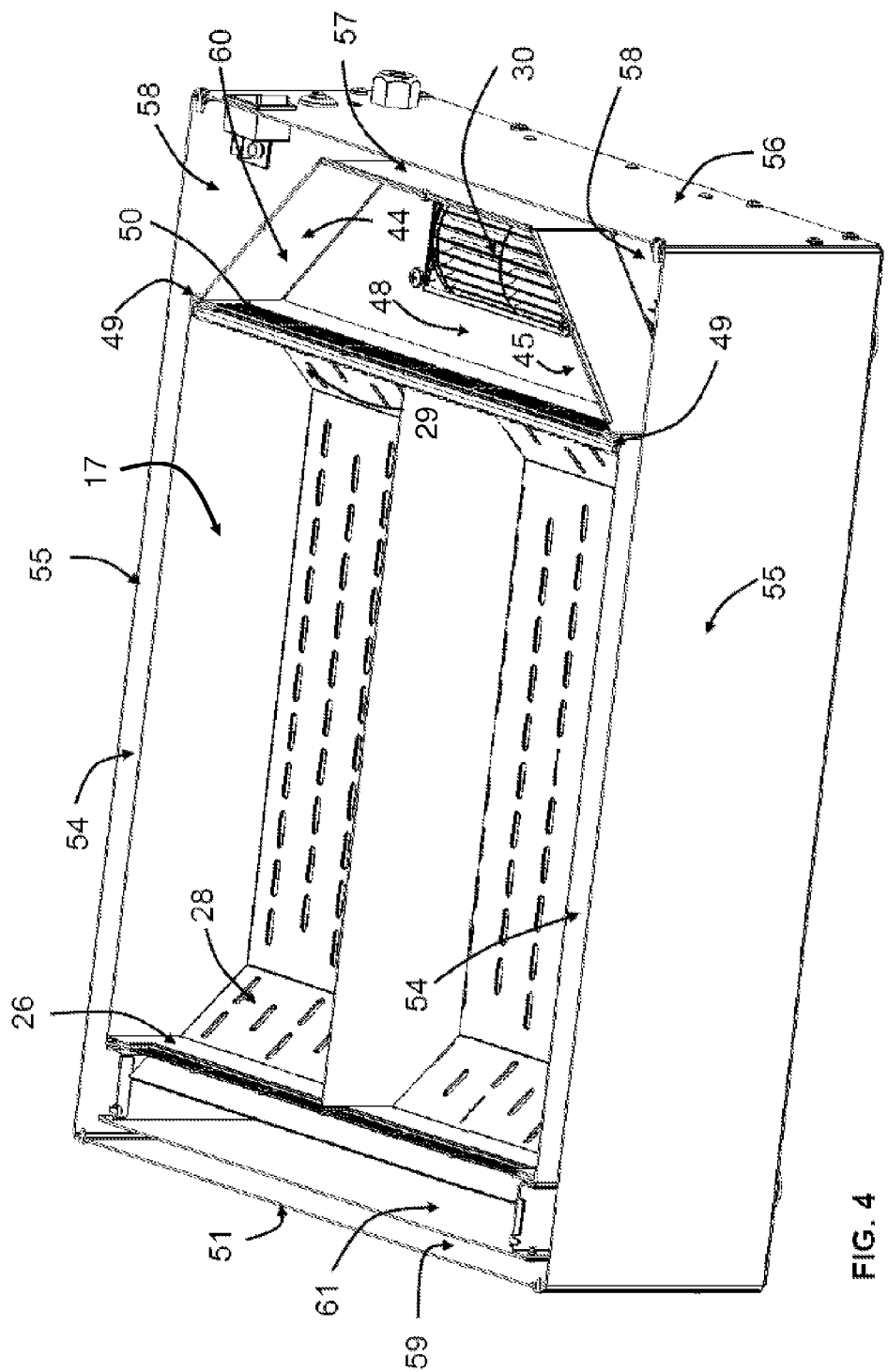
FIG. 4 is a perspective view, in partial cross-section, taken on section lines 3-3 of FIG. 1.

A hollow air wall is formed, in one embodiment shown in FIGS. 2, 3, and 4 as pairs of spaced apart walls: front air wall 51,59,61 (housing front wall 51-hollow 59-outer wall of air channel vertical front section 61), back air wall 56, 57,16 (housing back wall 56-hollow 57-air funnel and food holding area back wall 16 of food holding area 13), and side air walls 55, 54, 17 (housing side wall 55-hollow 54-food holding area sidewalls 17 of food holding area 13). The hollow air wall is also defined and closed at the top by horizontal front surface 36, back air wall by horizontal back surface 37, and sidewalls by an overhanging flange of housing side walls 55. By surrounding the interior lateral periphery of the housing, this hollow air wall insulates the apparatus, protects bystanders and workers from the hot interior of warmer apparatus 10, and stores warm air that may enter through horizontal section 41 of air channel 81, which is in fluid communication with the back air wall (51, 59, 61). The air wall may have many embodiments. Another embodiment (not shown) of side air wall 55, 54, 17 closes the top of the side air wall with an overhanging flange of food holding area sidewalls 17 of food holding area 13. In another embodiment, the airwall comprises a hollow wall, closed at the top, that lies within the lateral periphery of, but does not include, the housing walls 51, 55, 56.

Crumb tray 70 (shown in FIG. 9) removably slides into horizontal section 41 of air channel 81, extending from front wall 51 of housing 13 to heater 40. Tray 70 collects food crumbs and grease that may fall through food holder 20 and enter horizontal section 41. Crumb tray 70 is detachably secured to warmer apparatus 10 by crumb tray clip receptacle portion 52, which fits underneath crumb tray clip 53 attached to the interior of horizontal section 41 of air channel 81. Crumb tray 70 also has deflector bracket portion 42 (shown in FIG. 3), which with deflector flange 92 joined to the interior of vertical front section 61 of air channel 81 and abutting crumb tray deflector bracket portion 42, facilitates a laminar flow of air as air moves from horizontal section 41 to front vertical section 61 of air channel 81. In one embodiment, deflector bracket portion 42 is disposed at a 45 degree angle, but other angles are also functional.

Air outlet port deflector bracket 43, attached to the interior of front vertical front section 61 forces air to flow from air channel 81 out to food holding area 13 to contact any food disposed in food holder 20. Guiding bracket 89 attached to the interior of front vertical section 61 below and adjacent to air outlet 84, shapes the air curtain to flow above any food disposed in food holder 20 and to re-enter air channel 81 through air inlet port 33.

Blower 30 is positioned within back air wall 56, 57, 16. Inlet 96 of blower 30 is positioned under air funnel opening 87 for receiving air; in one embodiment, blower 30 is connected to air funnel base 48. Blower 30 exhausts air into horizontal section 41 of air channel 81. Under typical operating conditions, blower 30 induces air flow from air funnel 60, creating a moderately negative air pressure area therein, and forces air through horizontal section 41 of air channel 81, creating a moderately positive air pressure area therein; the area of back air wall 56, 57, 16 containing blower 30 that surrounds blower 30 has a neutral air pressure. Under adverse conditions, such as when oil may clog an air filter or block an air outlet port, that greatly decrease air flow within air channel 81, blower 30 acts as a differential pressure switch, allowing warmer apparatus 10 to continue to properly condition the food. In the case of air filter 50 being clogged, which creates a greatly negative pressure area in air funnel 60, blower 30 draws air, through space beneath funnel extension 88 from back air wall 56, 57, 16 instead of from air funnel 60. In the case of a blocked air outlet port, which creates a greatly positive air pressure in horizontal section 41 of air channel 81, blower 30 draws air, through space under funnel extension 88 from back air wall 56, 57, 16 instead of from air funnel 60 and exhausts air to air funnel 60 instead of to horizontal section 41 of air channel 81. Many types of blowers including but not limited to an axial fan may function to provide adequate air flow within warmer apparatus 10. The embodiment shown in FIG. 3 represents blower 30 as a crossflow blower.

The heater 40 is positioned adjacent to blower 30 (connected to blower 30 in one embodiment) within horizontal section 41 of air channel 81 and may have different embodiments, one of which is a wire heater, another of which is a calrod heater. Many heaters having a thermostat also have an asymmetric performance profile, due to placement of the thermostat on one side of the heater. Likewise, many blowers show an asymmetric performance profile, so aligning the heater and blower to reduce the asymmetric heating effect or even neutralize the performance asymmetry provides a significantly more even performance.

Figure 7:
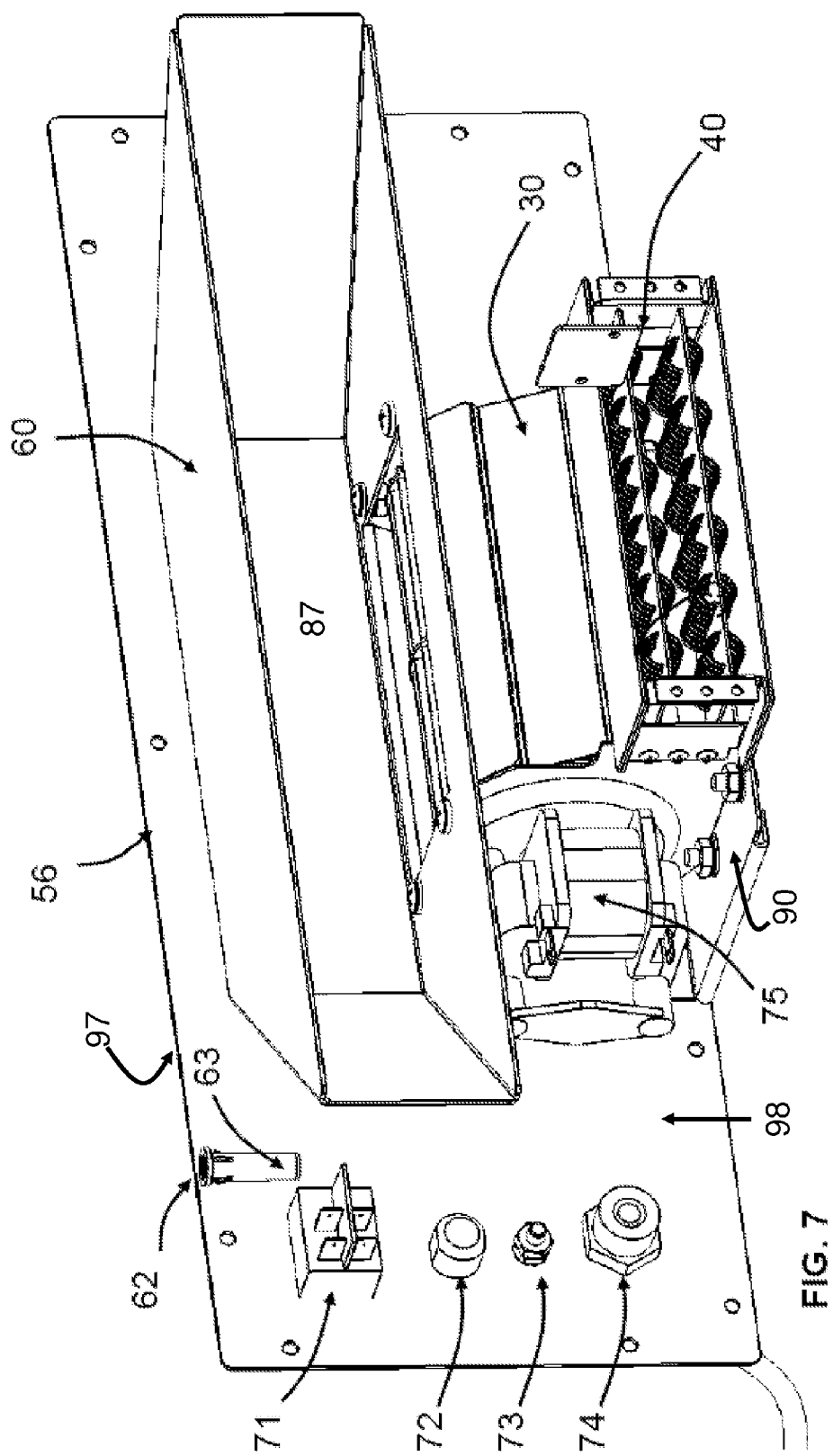
FIG. 7 is a front perspective view of the control panel.
Figure 8:
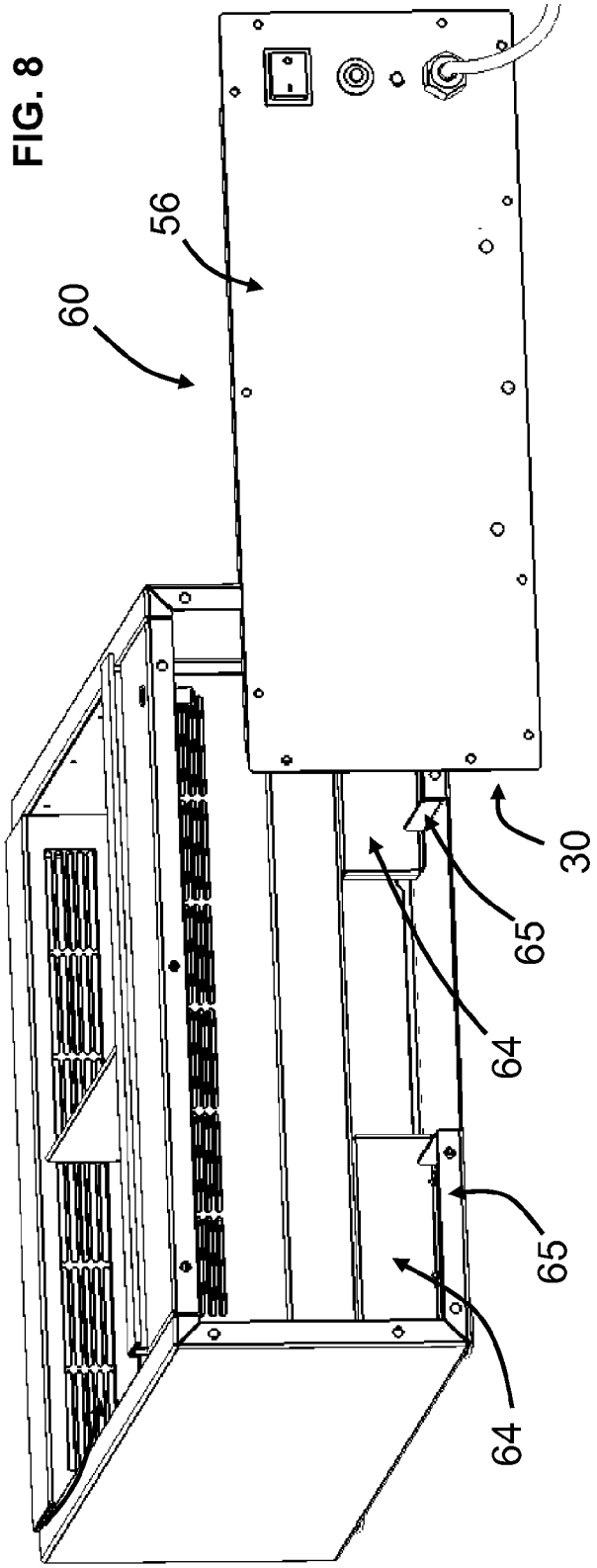
FIG. 8 is a back perspective view of the warmer apparatus with the control panel detached from the apparatus.

In one embodiment, the electrical controls are attached to back wall 56 of housing 13, forming control panel 56 that has floor 90 for supporting the blower 30 and heater 40 which may be replaced if malfunction occurs. Attached controls 98 include controls for heater 40, blower 30, a blower motor 75 that operates blower 30, air funnel 60 and attached ultraviolet light 91, electrical receptacle 74 for receiving electrical power, electrical ground 73 for stabilizing electrical states, high temperature shutoff device 72 (such as a circuit breaker shown in FIGS. 7 and 8 or a thermal fuse), set to at least 60 degrees F. above the standard operating temperature of the apparatus, for disconnecting electrical power from the blower motor 75 and heater 40 under destructive conditions (such as a grease fire) that overwhelm the ability of warmer apparatus 10 to operate under adverse conditions, a thermostat (not shown) located within the heater 40, or in another embodiment located downstream from the heater to measure the temperature of air coming from the heater in horizontal air channel 41, or in another embodiment located in the front vertical air channel 61 set to, in one embodiment, at least 30 degrees F. above the operating temperature of warmer apparatus 10 for disconnecting electrical power from heater 40 under destructive conditions, on/off switch 71 for controlling the supply of electrical power to warmer apparatus 10, and optionally a light source 63 for indicating the operating state of warmer apparatus 10; a corresponding light tube 62 unconnected to the light source may be placed through horizontal back surface 37 closing the top of back air wall 56, 57, 16.

Performance of warmer apparatus 10 is stable, needing no thermostat under standard or adverse operating conditions. Air channel dimensions, the air curtain, and a functionally compatible heater 40 and blower 30 cooperate to create operational stability in the absence of a thermostat. In one embodiment, the apparatus maintains thermal stability over a range of about 600 to 800 Watts of heat output, and over a 20 degree F. variation in room temperature, if the heat displacement factor, defined as units of power, here measured in Watts, distributed to moving air relative to a three-dimensional space, here the horizontal air channel 41 in cubic inches is about 2.0 to 3.0 Watts per cubic inch of horizontal air channel 41 air space and the horizontal air channel 41 air velocity is about 400 to 800 feet per minute. The heat displacement factor is a good indicator for selecting the proper heater size and performance when different sizes of warmer apparatus 10 need to be designed. Typically, the holding temperature of fried food and the temperature of air in the horizontal section of the air channel 41 is about 135 to about 185 degrees F., the air outlet 84 temperature is about 175 to about 235 degrees F., air velocity in the horizontal section 41 of the air channel is about 400 to about 800 feet per minute, and air velocity at the air outlet 84 is about 500 to about 1500 feet per minute.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A warmer apparatus comprising:
  an airflow assembly, including a food holding area for holding cooked food having a food holder comprising a base for radiating heat to the cooked food, and defining an air channel with a horizontal section, positioned below the base, with a front vertical section having an air outlet, and with a back vertical section, positioned apart from and opposite to the front vertical section, having an air inlet positioned opposite to and aligned with the air outlet, for receiving air from the air outlet, the air channel being configured to direct recirculation of warm flowing air through the horizontal section, for transferring heat received from the warm air to heat the food holder base to a noncooking, biologically safe food holding temperature, through the front vertical section and air outlet to outside the channel, downwardly to the food holding area, for conditioning the food to attain the noncooking, biologically safe food holding temperature and to retain its freshly cooked texture and internal moisture, to create a warm insulating air curtain, flowing horizontally above and across the food and through the air inlet into the back vertical section, for returning air to the horizontal section, the airflow assembly further having a hollow air wall, closed at the top, surrounding the lateral periphery of the base and the air channel, in fluid communication with the air channel, for storing air warmed by the recirculating warm air;

a housing, for safely enclosing the apparatus, the housing comprising:
   a floor, underlying the apparatus; and
   a wall, laterally enveloping and attached to the housing floor, comprising:
      a back section, adjacent to the back vertical section of the air channel;
      a front section, adjacent to the front vertical section of the air channel; and
      louvers; and a forced warm air convection mechanism, including a blower, positioned within the hollow air wall and the back vertical section to receive air from the air inlet under standard operating conditions and from the air wall under adverse conditions, for forcing warm air through and out of the air channel at a velocity that conditions the food to retain its freshly cooked texture and internal moisture, and to attain the noncooking, biologically safe food holding temperature, and contributes to transferring heat from the warm air in the horizontal section to heat the food holder base to the noncooking, biologically safe food holding temperature; and a heater, connected to and operationally aligned with the blower, and positioned within the horizontal section, for heating air to a temperature that conditions the food to attain the noncooking, biologically safe food holding temperature.

2. The warmer apparatus of claim 1, further comprising: electrical controls, for controlling the operation of the apparatus, with an electrical receptacle and an electrical ground wherein an operationally stable, non-thermostatically controlled balance of radiant heat, convection heat, and air curtain insulation condition the cooked food to attain the noncooking, biologically-safe food holding temperature and to retain its freshly cooked texture and internal moisture, under standard and adverse operating conditions.

3. The apparatus of claim 1, wherein:
a. the distance separating the air outlet and the air inlet is about 12 to about 18 inches;
b. the heater output is about 600 to about 800 Watts, such that the heat output of the heater is about 2.0 to about 3.0 Watts per cubic inch of horizontal section air space;
c. the noncooking, biologically safe food holding temperature is about 140 to about 185 degrees F.;
d. the air temperature at the air outlet is about 175 to about 235 degrees F.;
e. the air velocity within the horizontal section of the air channel is about 400 to about 800 feet per minute; and
f. the air velocity within the air outlet is about 500 to about 1500 feet per minute.

4. The apparatus of claim 3, wherein:
a. the noncooking, biologically safe food holding temperature is about 145 to about 165 degrees F.;
b. the air temperature at the air outlet is about 195 to about 210 degrees F.;
c. the air velocity within the horizontal section of the air channel is about 500 to about 600 feet per minute;
d. the air velocity at the air outlet is about 800 to about 1200 feet per minute; and e. the heat output of the heater is about 2.4 to about 2.5 Watts per cubic inch of horizontal section air space.

5. The apparatus of claim 1, wherein:
a. the distance separating the air outlet and the air inlet is about 14 to about 18 inches;
b. the heater output is about 700 Watts, such that the horizontal section of the air channel has a heat displacement factor of about 2.4 to about 2.5 Watts per cubic inch of horizontal section air space;
c. the noncooking, biologically safe food holding temperature is about 150 to about 170 degrees F.;
d. the air temperature at the air outlet is about 170 to about 200 degrees F.;
e. the air velocity within the horizontal section of the air channel is about 500 to about 600 feet per minute; and
f. the air velocity at the air outlet is about 800 to about 1200 feet per minute.

6. The apparatus of claim 1, wherein:
a. the food holding area further comprises:
   i. a floor, for conducting heat to the food holder base; and
   ii. a wall, enveloping and sealed to the lateral periphery of the floor, for containing heat within the food holding area; and
b. the food holder further comprises:
   i. a surface, spaced above and connected to the food holder base, for contacting and supporting the food, the surface comprising a plurality of apertures, for admitting heat radiating from the food holder base to the food;
   ii. an upright wall, joined to the food holder base, the wall comprising:
      A. a plurality of apertures, for admitting warm flowing air to the food;
      B. an angled section, attached to the food holder base, for facilitating recovery of the food from the food holder, comprising a plurality of slots;
      C. a front section, positioned adjacent to the air outlet, comprising:
         I. an air outlet port; and
         II. a horizontal flange, positioned to support the food holder atop the air channel;
      D. a back section, positioned adjacent to the air inlet, comprising:
         I. an air inlet port; and
         II. a horizontal flange, positioned to support the food holder atop the air channel; and
   iii. at least one divider, removably insertable into the food holder angled section slots, for compartmentalizing the food holder surface.

7. The apparatus of claim 6, wherein the back section of the food holder further comprises a vertical flange, downwardly connected to the front section horizontal flange, for orienting the food holder within the food holding area.

8. The apparatus of claim 1, wherein the back vertical section of the air channel further comprises:
a. an air funnel, positioned within the vertical section of the air channel adjacent to the air inlet, for directing warm flowing air received from the air inlet to the blower;
b. an air filter bracket, positioned between the air inlet port and the funnel, the bracket comprising an air filter, for removing air impurities from the warm air flowing into the air funnel.

9. The apparatus of claim 8, wherein an ultraviolet light is positioned within the air funnel for burning flammable air impurities.

10. The apparatus of claim 8, wherein the air filter bracket is supported by the food holding area wall adjacent to the back section of the air channel.

11. The apparatus of claim 8, wherein the air filter bracket is attached to the back section of the food holder wall.

12. The apparatus of claim 8, wherein the air filter comprises at least one layer of expanded stainless steel metal that is unflattened and has a maximum thickness of 0.025 inches.

13. The apparatus of claim 1, wherein the hollow air wall is defined by said wall of said housing.

14. The apparatus of claim 13, wherein:
   a. the food holding area wall comprises:
      i. a back section, adjacent to the back vertical section of the air channel,
      ii. a front section, adjacent to the front vertical section of the air channel,
      iii. a first side section, and
      iv. a second side section, opposite the first side section;
   b. the air wall comprises the first and second side sections of the food holding area;
   c. the front vertical section of the air channel comprises the front section of the food holding wall; and
   d. the back vertical section of the air channel comprises the back section of the food holding area wall.

15. The apparatus of claim 14, wherein the back section of the housing wall comprises a detachable control panel, comprising:
   a. a floor, joined to the back section of the housing wall, for supporting the control panel;
   b. the blower, attached to the control panel floor;
   c. a blower motor, attached to the blower, for providing electrical power to the blower;
   d. the heater, connected to the blower, for receiving air from the blower; and
   e. the electrical controls, embedded in the back section of the housing wall, the controls further comprising:
      i. a high temperature shutoff device, for disconnecting electrical power from the blower motor and the heater under destructive conditions;
      ii. a thermostat, set to at least 30 degrees F. above the operating temperature of the apparatus, for disconnecting electrical power from the heater under destructive conditions;
      iii. an on/off switch, for indicating the operating state of the apparatus;
      iv. optionally, a light source, for indicating the operating state of the apparatus;
      v. the air funnel, attached to the back section of the housing wall;
      vi. the ultraviolet light, positioned within the air funnel; and
      vii. optionally, a light tube, embedded within and extending above the top of the housing wall adjacent to the back vertical section of the air channel, for displaying light from the light source indicating the operating state of the apparatus.

16. A warmer apparatus, comprising:
   an airflow assembly, including a food holding area for holding cooked food having a food holder comprising a base for radiating heat to the cooked food, and defining an air channel with a horizontal section, positioned below the base, with a front vertical section having an air outlet, and with a back vertical section, positioned apart from and opposite to the front vertical section, having an air inlet positioned opposite to and aligned with the air outlet, for receiving air from the air outlet, the air channel being configured to direct recirculation of warm flowing air through the horizontal section, for transferring heat received from the warm air to heat the food holder base to a noncooking, biologically safe food holding temperature, through the front vertical section and air outlet to outside the channel, downwardly to the food holding area, for conditioning the food to attain the noncooking, biologically safe food holding temperature and to retain its freshly cooked texture and internal moisture, to create a warm insulating air curtain, flowing horizontally above and across the food and through the air inlet into the back vertical section, for returning air to the horizontal section, the airflow assembly further having a hollow air wall, closed at the top, surrounding the lateral periphery of the base and the air channel, in fluid communication with the air channel, for storing air warmed by the recirculating warm air;
   a forced warm air convection mechanism, including a blower, positioned within the hollow air wall and the back vertical section to receive air from the air inlet under standard operating conditions and from the air wall under adverse conditions, for forcing warm air through and out of the air channel at a velocity that conditions the food to retain its freshly cooked texture and internal moisture, and to attain the noncooking, biologically safe food holding temperature, and contributes to transferring heat from the warm air in the horizontal section to heat the food holder base to the noncooking, biologically safe food holding temperature; a heater, connected to and operationally aligned with the blower, and positioned within the horizontal section, for heating air to a temperature that conditions the food to attain the noncooking, biologically safe food holding temperature; and
   a crumb tray assembly, comprising:
   a. a tray, slidably positioned within the horizontal section of the air channel and extending from the front vertical section of the air channel to the heater, for holding crumbs and grease separated from the food, comprising:
      i. a deflector bracket portion, for promoting laminar air flow and for deflecting flowing air toward the air outlet port; and
      ii. a clip receptacle portion; and
   b. a clip, attached to the inside of the horizontal section of the air channel, for detachably securing the crumb tray to the apparatus.

17. The apparatus of claim 1, wherein the vertical front section of the air channel further comprises:
   a. a deflector flange, joined to the inside of the vertical front section near the horizontal section of the air channel, for promoting laminar air flow and for deflecting air flow toward the air outlet port;
   b. an air outlet port deflector bracket, attached to the inside of the front vertical front section, for forcing air through the air outlet port; and
   c. a guiding bracket, attached to the inside of the front vertical section, below and adjacent to the air outlet, for forming the air curtain.

* * * * *